United States Patent
Khmaissia et al.

(10) Patent No.: US 12,266,203 B2
(45) Date of Patent: Apr. 1, 2025

(54) MULTIPLE INPUT MACHINE LEARNING FRAMEWORK FOR ANOMALY DETECTION

(71) Applicant: Intuit Inc., Mountain View, CA (US)

(72) Inventors: Fadoua Khmaissia, Louisville, KY (US); Efraim David Feinstein, San Jose, CA (US); Preeti Duraipandian, Plano, TX (US)

(73) Assignee: Intuit Inc., Mountain View, CA (US)

( * ) Notice: Subject to any disclaimer, the term of this patent is extended or adjusted under 35 U.S.C. 154(b) by 577 days.

(21) Appl. No.: 17/515,163

(22) Filed: Oct. 29, 2021

(65) Prior Publication Data

US 2023/0132720 A1  May 4, 2023

(51) Int. Cl.
| | |
|---|---|
| *G06V 30/416* | (2022.01) |
| *G06F 18/2113* | (2023.01) |
| *G06N 3/088* | (2023.01) |
| *G06V 30/19* | (2022.01) |

(52) U.S. Cl.
CPC ........ *G06V 30/416* (2022.01); *G06F 18/2113* (2023.01); *G06N 3/088* (2013.01); *G06V 30/19013* (2022.01)

(58) Field of Classification Search
CPC .. G06F 18/2113; G06V 10/82; G06V 30/133; G06V 30/148; G06V 30/19013; G06V 30/412; G06V 30/416; G06N 3/088
See application file for complete search history.

(56) References Cited

U.S. PATENT DOCUMENTS

| | | | | |
|---|---|---|---|---|
| 9,471,882 | B2 * | 10/2016 | Hido | G06Q 10/10 |
| 11,294,756 | B1 * | 4/2022 | Sadrieh | G06N 3/047 |
| 11,763,086 | B1 * | 9/2023 | Sandu | G06N 3/045 |
| | | | | 704/9 |
| 2013/0144593 | A1 * | 6/2013 | Och | G06F 40/49 |
| | | | | 704/2 |
| 2014/0180980 | A1 * | 6/2014 | Hido | G06Q 10/10 |
| | | | | 706/12 |
| 2019/0286085 | A1 * | 9/2019 | Kawanoue | G06N 20/00 |
| 2020/0364551 | A1 * | 11/2020 | Dwivedi | G06N 3/08 |
| 2021/0012272 | A1 * | 1/2021 | Dugar | G06T 7/0008 |
| 2021/0297498 | A1 * | 9/2021 | Divakaran | G06Q 30/0631 |
| 2021/0304002 | A1 * | 9/2021 | George | G06N 3/047 |
| 2022/0292304 | A1 * | 9/2022 | Suzani | G06N 3/0455 |
| 2022/0327389 | A1 * | 10/2022 | AlRegib | G06N 3/045 |

OTHER PUBLICATIONS

Guha, et al., "Hybrid Approach to Document Anomaly Detection: An Application to Facilitate RPA in Title Insurance", Feb. 2021, International Journal of Automation and Computing, pp. 55-72 (Year: 2021).*

Gebhardt et al., "Document Authentication using Printing Technique Features and Unsupervised Anomaly Detection", 2013, IEEE, pp. 479-483 (Year: 2013).*

Oucheikh et al., "Product verification using OCR classification and Mondrian conformal prediction", Sep. 2021, ELSEVIER, pp. 1-14 (Year: 2021).*

* cited by examiner

*Primary Examiner* — Zhiyu Lu
(74) *Attorney, Agent, or Firm* — Lathrop GPM LLP

(57) ABSTRACT

A method that includes extracting image features of a document image, executing an optical character recognition (OCR) engine on the document image to obtain OCR output, and extracting OCR features from the OCR output. The method further includes executing an anomaly detection model using features including the OCR features and the image features to generate anomaly score, and presenting anomaly score.

15 Claims, 5 Drawing Sheets

MULTIPLE INPUT MACHINE LEARNING FRAMEWORK FOR ANOMALY DETECTION

BACKGROUND

Document content extraction is the process by which content is extracted from documents for indexing and storage. For many documents, the original version of the document from which content is to be extracted is a document image. A document image is an image file of a document, such as a scanned image or other image formatted file. Text, while readable to a human, are saved in pixel format in the document image.

Document images may have artifacts, such as stray markings, missing markings, incorrect orientation, variable lighting, as well as have handwriting or being only a partial image of the document. Thus, because the original format is an image file, the accuracy of the extraction may be reduced. For example, characters may be identified incorrectly or not at all. For large companies and organizations, batch processing of content extraction from document images is performed and stored in a data repository. Accordingly, data integrity fails if the extraction is inaccurate. For batch processing, a problem exists in identifying which document images has inaccurate extraction.

SUMMARY

In general, in one aspect, one or more embodiments relate to a method that includes extracting image features of a document image, executing an optical character recognition (OCR) engine on the document image to obtain OCR output, and extracting OCR features from the OCR output. The method further includes executing an anomaly detection model using features including the OCR features and the image features to generate anomaly score, and presenting anomaly score.

In general, in one aspect, one or more embodiments relate to a system including a computer processor, an image feature extractor configured to extract image features from a document image, and an OCR feature extractor configured to extract optical OCR features from OCR output of an OCR engine. The system further includes an anomaly detection model, executing on the computer processor, configured to generate an anomaly score using features including the OCR features and the image features.

In general, in one aspect, one or more embodiments relate to a method including extracting image features of a training document image, executing an OCR engine on the training document image to obtain OCR output, and extracting OCR features from the OCR output. The method further includes executing an anomaly detection model using features including the OCR features and the image features to obtain reconstructed input, determining, by the anomaly detection model, reconstruction error, based at least in part on the reconstructed input, and updating, by the anomaly detection model, weights of the anomaly detection model using the reconstruction error.

Other aspects of the invention will be apparent from the following description and the appended claims.

DETAILED DESCRIPTION

Figure 1:
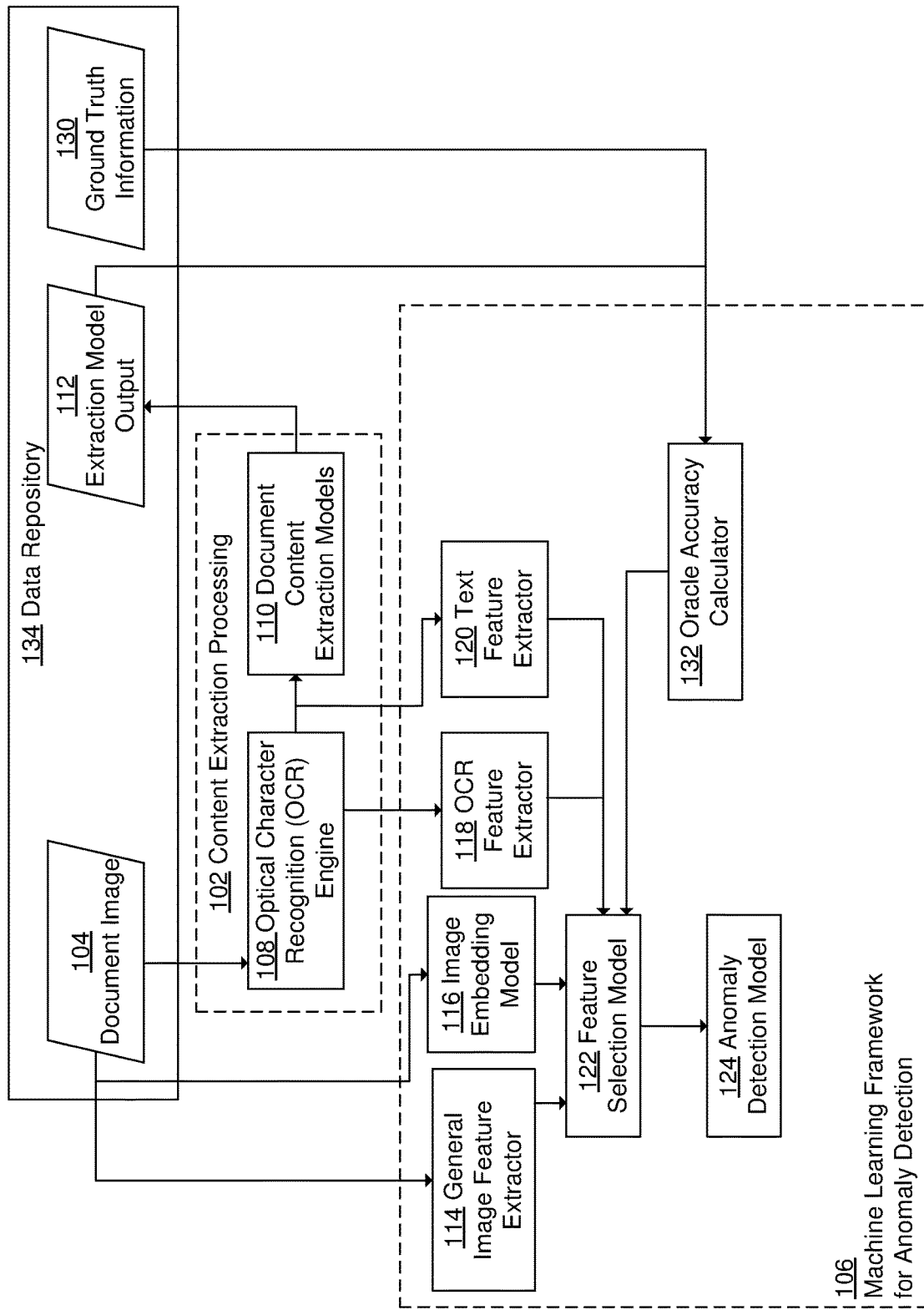
FIG. 1 shows a diagram of a system for multiple input machine learning framework for anomaly detection in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to extraction accuracy for extracting contents from a document image. For some document images, the accuracy of the extraction is low (e.g., satisfying an anomaly threshold). Document images in which the extraction accuracy is low is referred to as an anomaly or anomalous document. The remaining document images having a greater accuracy is referred to as a non-anomalous or normal document. One or more embodiments are directed to a machine learning solution to predict the extraction accuracy of the document (e.g., whether a document image is an anomalous document or a non-anomalous document) through generating an anomaly score for the document. By predicting whether the document is anomalous or non-anomalous, remedial actions may be performed for anomalous documents. For example, the anomalous documents can be routed to a different document content extraction model or could be used to calibrate a training module that estimates field-wise confidence scores.

One or more embodiments are directed to a machine learning framework for determining anomaly score. The anomaly score is a prediction of the extraction accuracy of a document image. The machine learning framework extracts and combines features from different parts of the content extraction processing, learns how a conforming document image is expected to appear, and through that learning, detects which document images are anomalous.

FIG. 1 shows a diagram of a system in accordance with one or more embodiments. In order to simplify the description, an overview of document images and content extraction processing (102) is described first. After the description of the content extraction processing, the machine learning framework for anomaly detection (106) is described.

A document image (104) (104) is an image version of a document. Namely, at least a portion of the characters (e.g., alphanumeric, or symbolic) in the document are stored in image form (e.g., as pixel information) rather than as a character encoding. The document image (104) is the state of the document prior to optical character recognition (OCR) processing. In one or more embodiments, the document is any type of document that includes characters. The document may be a structured document. A structured document is a set of information where the formatting, number, and layout are static across document instances of the same type of document. For example, a structured document may be a form with boxes for users to enter text. Examples of structured document include financial forms, student and employment application forms, reporting forms, and other such documents. The document includes multiple keys. Each key is visual information on the document that is to be extracted and includes a key identifier, key value pair. For example, the key value may be information that an individual writes on a form, whereas the key identifier relates the value to a type of information (e.g., "first name attribute").

The content extraction processing (102) of the document image (104) involves at least two components. The first component is an optical character recognition engine. The second component is a document content extraction model. Both of these components is described below.

OCR engine (108) is software that recognizes individual characters from the document image to generate OCR output (not shown). The OCR output is a set of bounding boxes, encoded characters in the bounding boxes, and evaluation metrics about the OCR performance. For example, the statistics may include various confidence scores that the character or bounding box is correctly identified. The OCR output may determine a set of key identifiers, a set of key values, and a set of bounding boxes.

One or more document content extraction models (110) are operatively connected to the OCR engine. The operative connection may be a communicative connection or only through shared data of using OCR output. Document content extraction models are configured to extract content from the documents using the OCR output. The extracted content may be in the form of key identifier, key value pairs. The key identifier may be an explicit identifier or an implicit identifier, such as based on the position within an ordered sequence of key values for different keys. The key value is the recognized characters grouped into strings of characters (e.g., grouped into individual words and phrases).

To identify key identifier, key value pairs, the document content extraction model (110) may use the location and values of recognized characters in the document image. Specifically, the document content extraction model (110) may learn location of key values and type of values that match particular key identifiers. The location may be with respect to the page or with respect to other text in the image. For example, document content extraction model may be configured to identify a key identifier and corresponding key value based at least in part on the relative position of the key description matching the key identifier with respect to the key value (e.g., being horizontally aligned, being proximate, etc.).

Different types of document content extraction models (110) may be used. For example, a template-based model has a defined template, whereby each key value for a particular key identifier is at a fixed location in the template. As another example, in a rule-based model, a set of rules are defined that specify the location of each key value for each particular key identifier. As another example, a machine learning based model may be a neural network that learns from the features of key values.

Each type of document may have an individual set of one or more extraction models (110) for the type of document. For example, a set of one or more document content extraction models may exist for IRS W-2 forms and a different set of one or more document content extraction models may exist for IRS 1040 forms. Within a set, each document content extraction model may operate independently or in conjunction with other models. For example, each model may independently generate extraction model output (112) that includes a confidence level of extracting the extracted contents. The extraction model output (112) for the document image (104) may be selected from the output of one of the document content extraction models.

Continuing with the discussion of FIG. 1, the machine learning framework for anomaly detection (106) is described below. Documents images being anomalous may be due to different levels of inputs to the document content extraction model. For example, the document image (104) being anomalous may be at the level of the image or at the level of the OCR output. As such, the machine learning framework (106) uses at least both image features and OCR features for anomaly detection. The image features are features from the document image (104) prior to OCR engine (108) recognition on the document image. As such, the image features are determined from the image version of the document. The OCR features are features from the text of the document. Thus, the OCR features are determined from the OCR output. The machine learning framework for anomaly detection (106) includes a general image feature extractor (114), an OCR feature extractor (118), an image embedding model (116), a text feature extractor (120), a feature selection model (122), an anomaly detection model (124), and an oracle accuracy calculator (132). Each of these components is presented below.

The general image feature extractor (114) is software configured to extract general image features from a document image. The general image features are at least part of the image features. Specifically, the general image feature extractor (114) is configured to calculate the general image features from the pixels of the document image, which is a raw image. General image features are statistics and generic descriptors extracted from the document images. The goal of the image features is to reflect the overall properties of the document image (104) and to obtain a high-level estimate of prospective anomalies. In one or more embodiments, each of the image features is represented by a column in the anomaly detector's input. Example image features include percentage of black to white pixels, ratio of black to white pixels, overall image brightness, and dimensions of the image (e.g., width and height, image orientation). For images in color, the image features may include the percentage or ratio of light-colored pixels to dark colored pixels in the document image.

The OCR feature extractor (118) is software configured to extract OCR features from the OCR output. OCR features are statistics and generic descriptors extracted from the OCR output. The goal of the OCR features is to reflect the overall properties of the OCR output and to obtain a high-level estimate of prospective anomalies. Each of the OCR features are features directly specified in the OCR output or calculated from the OCR output. Examples of OCR features include probability of the OCR output being in a defined natural language (e.g., English, Spanish) as compared to "gibberish;" a number of detected lines; ratio of letters, digits and special characters identified in the OCR output; number of detected keys; number of detected key values; mean and standard deviation of detected key values confidence scores as determined by the OCR engine; mean and standard deviation of detected keys confidence scores as determined by the OCR engine; mean and standard deviation of line confidence scores; mean and standard deviation of line top and left coordinates; mean and standard deviation of line width and height; and mean and standard deviation of number of words per line. With respect to the various confidence scores, the OCR engine (108) may directly determine and include the confidence score for each key value, key identifier, line, bounding box, and location of bounding box identified in the OCR output. The confidence score identifies the accuracy of identification of the respective item in the output. The OCR feature extractor (118) is configured to calculate statistics from the respective confidence scores. The above are only an example set of features that may be included. Other OCR features may be used in the machine learning framework.

The image embedding model (116) is configured to generate image embedding model (116) features from the document image. The image embedding model (116) features is a feature vector obtained by mapping the raw input images (i.e., document images) using a pretrained model used for document image classification. The image embedding model (116) may be a trained convolutional neural network (CNN) model that is trained to classify document images into predefined categories of a particular domain (e.g., classify financial document images into particular types of documents). The classification may be based, for example, on appearance and layout structure, which are indicative of document type. An example of a CNN model architecture that may be used is MobileNet-v2. Other CNN architectures may be used without departing from the scope of the invention. In one or more embodiments, the output of the fully connected layer of the CNN is the feature vector produced by image embedding model (116) for the image embedding model (116) features. The image embedding model (116) features may also be a part of the image features.

The text feature extractor (120) is configured to extract text features based on a template of the document type. For example, if the document image (104) is a structured document, the document image (104) may have a corresponding template based on the document type. The template has a predefined formatting and layout. Further, the template may have textual based descriptions describing the input for a user to enter (e.g., "first name", "what is your first name", "Qualified Dividends", "Wages, salaries, tips, etc. Attach Form(s) W-2", etc.). The text feature extractor (120) is configured to extract terms (i.e., a vocabulary corpus) from the textual based descriptions as well as from keywords describing the document. Using the vocabulary corpus, a term frequency inverse document frequency (TF-IDF) vectorizer is defined that is fitted to the vocabulary corpus.

For each input document (i.e., from the OCR output, the input document is vectorized based on the trained TF-IDF vectorizer. The result is a vector that has the unique words based on the template and the frequency of the unique words. For example, the vector may have the TF-IDF value for unique keywords in the document as found by the TF-IDF vectorizer.

By way of an example, consider a scenario in which a standard template of a W-2 has twenty unique words in the document. Each word has a computed frequency. The computed frequency may be the TF-IDF standard value. For example, "security" may have 0.5 for the standard value. For a new filled-in W-2 form, the text in the OCR output is extracted from the document and processed by the trained TF-IDF vectorizer. Thus, a feature vector is created that has, for each word, the appearance of the word.

While the architecture of the text feature extractor (120) is generic across document types, the trained text feature extractor (120) is specific to the document type. Thus, text features are specific to the document type.

Continuing with the machine learning framework, the image embedding model (116) and extractors are connected to a feature selection mode. The feature selection model (122) is configured to apply weights to features based on relevance. Because relevance can vary across document types, the output of the feature selection model (122) is dependent on the document type. For instance, {feature A and B might be relevant for W2, but feature C and D are relevant for 1099}. Notably, the feature selection module does not have to know what type of document that the feature selection model is processing. The feature selection model takes, as input, all the extracted features (document type needs to be specified at the feature extraction step though), and the feature selection model automatically generates the subset of the most relevant features.

To learn the weights, the feature selection model (122) uses the set of features and an evaluation metric defining the performance of extraction from documents of the document type. The evaluation metric is calculated during training, with respect to the given document image and the ground truth of the document image. During testing, the evaluation metric is calculated to determine the generalizability of the model to documents that were not present in training. For each input document used in training, the evaluation metric represents the difference between the ground truth and predicted key value-key identifier pairs output by a document contents extraction model.

Based on the set of features and the evaluation metric, the subset of features is selected. In one or more embodiments, feature selection is performed using RReliefF feature selection. RReliefF also aims to rank feature importance while considering their inter-dependencies. RReliefF takes into consider the dependence between the features and the target, and also penalizes features that are inter-correlated. Further, RReliefF reduces the weight of one of the features of a feature set that have similar redundant correlation. Thus, duplicative correlative effects are removed. For each feature, RReliefF algorithm calculates a weight that reflects feature relevance to the target variable.

In one or more embodiments, the feature selection model (122) is dependent on a weight threshold, such as stored in a configuration file. The weight threshold defines the minimum weight for a feature to be selected for the anomaly detection model. In one or more embodiments, the weight threshold may be set by default as the mean of the weights of the features.

An anomaly detection model (124) is operatively connected to the feature selection model. In one or more embodiments, the anomaly detection model (124) is an unsupervised machine learning model. The anomaly detection model (124) takes, as input, the subset of features from the feature selection model (122) and generates, as output, an anomaly score.

In one or more embodiments, the anomaly detection model (124) include a Variational AutoEncoder (VAE) model. A VAE model is an artificial neural network machine learning model that has an encoder and a decoder. The encoder encodes the subset of features into a multivariate latent distribution. Then, the decoder attempts to reconstruct the subset of features as accurately as possible into reconstructed input. The difference between the reconstructed input and subset of features is a reconstruction error. Based on the reconstruction error, the VAE model generates an anomaly score and a label as to whether the document image (104) is an inlier or outlier. For example, the anomaly detection model (124) may output a label "0" or "1" to indicate whether the input document is an "inlier" or an "outlier", respectively. The anomaly score may be in the range of 0 to 1 indicating a propensity to be an outlier. An inlier document is considered non-anomalous, and an outlier is considered anomalous.

Although a VAE model is described above, other anomaly detection models may be used. For example, an AutoEncoder model, a principal component analysis (PCA) model, or an isolation forest model may be used as the anomaly detection model.

Continuing with the machine learning framework for anomaly detection (106), an oracle accuracy calculator (132) is configured to calculate the oracle accuracy for training the feature selection model (122) and the anomaly detection model (124). The oracle accuracy calculator (132) is configured to calculate the oracle accuracy for document images and select document images that are training document images based on the oracle accuracy. A subset of document images have ground truth information (130). The ground truth information (130) is accurately defined key identifier, key value pairs for document images. Namely, a document image (104) has labels of key identifier, key value pairs that are deemed accurate. Ground truth information (130) is deemed free from errors. For example, ground truth information (130) may be obtained by a human through manual labeling process. The ground truth information (130) is compared against the extraction model output (112) from multiple extraction models to obtain an oracle accuracy. If the oracle accuracy satisfies a target accuracy threshold, then the document image is deemed non-anomalous. As such, the document image may be selected as a training document image.

Continuing with the discussion of FIG. 1, the data repository (134) is any type of storage unit and/or device (e.g., a file system, database, collection of tables, or any other storage mechanism) for storing data. Further, the data repository (134) may include multiple different storage units and/or devices. The multiple different storage units and/or devices may or may not be of the same type or located at the same physical site. The data repository (134) includes functionality to store document images, extraction model output, and ground truth information.

By having the machine learning framework for anomaly detection (106) detect the accuracy of extracting content from document images, data integrity of the data repository (134) is increased. Specifically, content extracted from anomalous documents may have missing or incorrect information. Detecting records with incorrect or missing information may be a challenge with large data repositories. By detecting anomalous documents, incorrect and incomplete information may be prevented from being stored in large data repository. Thus, the data integrity of the data repository (134) is increased.

While FIG. 1 shows a configuration of components, other configurations may be used without departing from the scope of the invention. For example, various components may be combined to create a single component. As another example, the functionality performed by a single component may be performed by two or more components.

Figure 2:
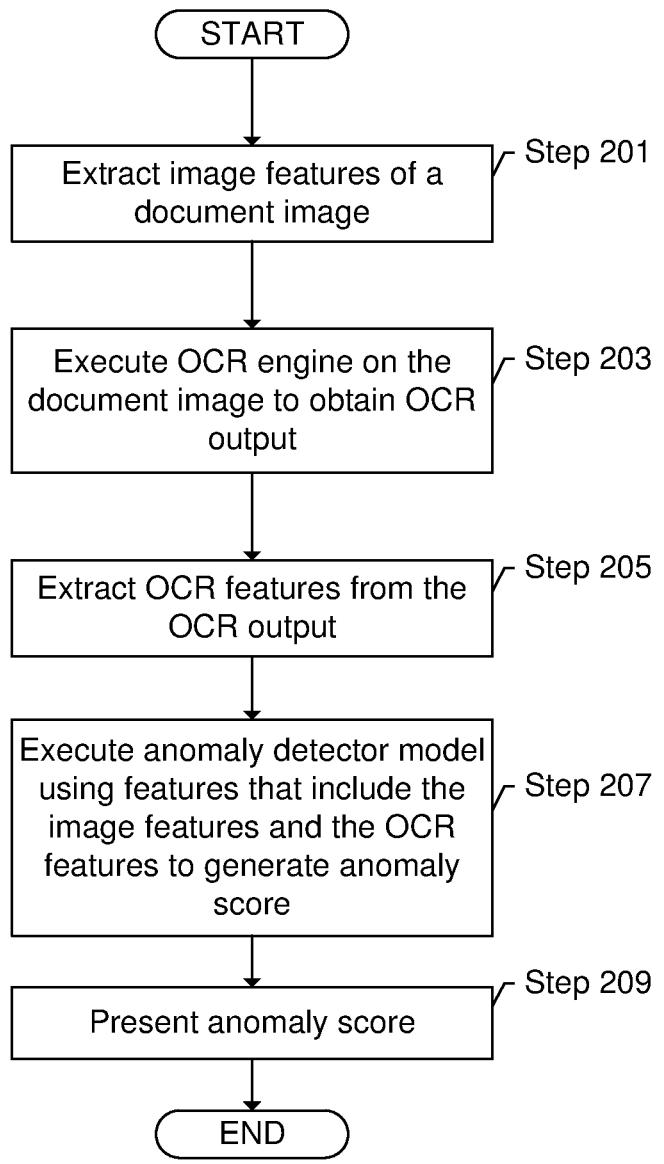
FIG. 2 shows a flowchart for multiple input machine learning framework for anomaly detection in accordance with one or more embodiments.

FIG. 2 shows a flowchart in accordance with one or more embodiments. While the various steps in this flowchart are presented and described sequentially, one of ordinary skill will appreciate that some or all of the steps may be executed in different orders, may be combined, or omitted, and some or all of the steps may be executed in parallel. Furthermore, the steps may be performed actively or passively.

In Step 201, image features of a document image are extracted. In one or more embodiments, image features include general image features and features obtained from executing an image embedding model. General image features may be directly calculated from the properties of the pixels. For example, statistical calculations, such as mean, variance, and standard deviation of the values of the pixels may be calculated directly from the pixels in the image. Similarly, image size and resolution may be determined from metadata of the image. The various general image features may be stored in a vector.

Further, in one or more embodiments, an image embedding model is executed on the document image. The image embedding model may be a CNN which is trained to classify the document image into document types. In one or more embodiments, the output of the fully connected layer in the image embedding model is used as a feature vector having image features. Thus, the output of the fully connected layer is added to the set of features.

In Step 203, an OCR engine is executed on the document image to obtain OCR output. The OCR engine analyzes the pixels of the images and identifies the characters that the pixels represent. The OCR engine encodes the identified characters into a character encoding and produces OCR output. The OCR engine may include a segmentation engine (not shown). The segmentation engine may be configured to segment the document image in order to detect text lines or bounding boxes around groups of text. For example, the segmentation engine may be configured to identify vertical or horizontal lines in the document indicating a form field. The segmentation engine may be performed as a preprocessing operation, during, or postprocessing operation to the character recognition.

In Step 205, OCR features are extracted from the OCR output. The OCR features may be gathered directly from the OCR output, such as by being particular values in the OCR output (e.g., number of lines, skew, etc.). As another example, the OCR features may be calculated from the values of the output, such as by calculating various statistics from the output.

In addition to OCR features and image features, text features may be extracted by a text feature extractor. The text feature extraction may be performed by executing a TF-IDF vectorizer that is trained for the document type on the OCR output.

The result of performing image feature extraction, OCR feature extraction, and text feature extraction is a set of features. In one or more embodiments, the set is reduced by the feature selection model so that only a subset of features are used. The feature selection model is trained based on the document type. Thus, the feature selection model corresponding to the document type is selected. The feature selection model selects the features having predefined weights above a weight threshold. Thus, in one or more embodiments, only a subset of features are input into the anomaly detection model.

In Step 207, the anomaly detection model is executed using the set of features that include the OCR features and the image features to generate an anomaly score. In one or more embodiments, the anomaly detection model uses, as input, the subset of features selected by the feature selection model. Because the feature selection model selects features based on the type of document, the execution by the anomaly detection model is specific to document type. Executing the anomaly detection model may include encoding the features (e.g., the set or subset of features) stored in an input vector into a multivariate latent distribution (e.g., stored in an encoded vector). Then, the multivariate latent distribution is decoded through the decoder model to obtain reconstructed input. The anomaly detection model generates a reconstruction error. From the reconstruction error, the anomaly detection model determines an anomaly score. The anomaly score may be the reconstruction error or the output of a function calculated from the reconstruction error. If the anomaly score satisfies an anomaly threshold, then the anomaly detection model labels the document image as anomalous. Otherwise, the document image is labeled non-anomalous. The anomaly threshold may be a default threshold or a configured threshold.

In Step 209, the anomaly score is presented. Presenting the anomaly score may be to output the anomaly score to a user interface, flag the document image as anomalous and output the flag to a computer program for further processing, or perform another action based on the anomaly score.

Document images identified as anomalous based on the anomaly score may undergo additional processing. For example, the additional processing may be through a more robust OCR engine and/or extraction model. As another example, the additional processing may be to send the document image to a graphical user interface for human processing. By identifying which document images are anomalous, and therefore may have low extraction accuracy, the overall data integrity of the data repository storing the key value pairs is increased.

Rather than additional processing, the user may be notified of the anomalous document image. In such a scenario, the user may be requested to reinput the document image and/or recheck that the user took an image of the correct document.

Figure 3:
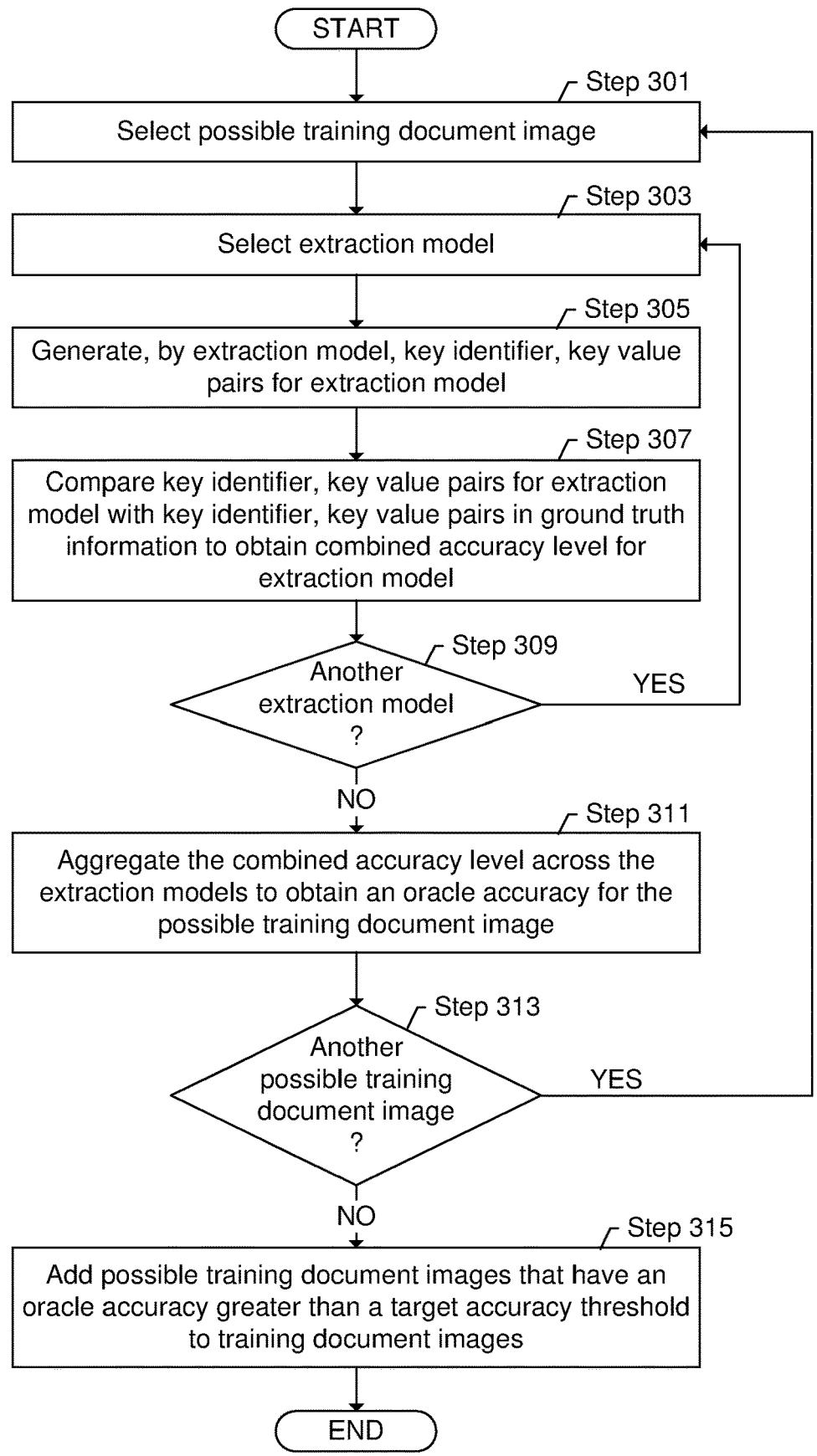
FIG. 3 shows a flowchart for selecting training document images in accordance with one or more embodiments.

FIG. 3 shows a flowchart for identifying training document images for training an anomaly detection model in accordance with one or more embodiments. In Step 301, possible training document image is selected. As discussed above, the training document image are the document images that have ground truth information. Further, in Step 303, an extraction model is selected. The extraction model generates key identifier, key value pair for the extraction model. Specifically, the OCR engine may be executed on the document image to obtain OCR output and the selected extraction model is executed on the OCR output to obtain the extraction model output having key identifier, key value pairs. In Step 307, the key identifier, key value pairs for the extraction model are compared again the key identifier, key value pairs in the ground truth information to obtain a combined accuracy level for the extraction model. For each key identifier, the key value extracted by the extraction model is compared against the corresponding key value in the ground truth information for the document image. The difference is the accuracy of the extraction. The combined differences across the key values of the document image is the combined accuracy level for the document image for the extraction model.

In Step 309, a determination is made whether another extraction model exists. If another extraction model exists, then the flow returns to Step 303. Otherwise, the flow proceeds to Step 311 to aggregate the combined accuracy level across the extraction models to obtain an oracle accuracy for the training document image.

In Step 313, a determination is made whether another training document image exists. If another training document image exists, the flow returns to Step 301 for processing the next training document image. Otherwise, the flow proceeds to Step 315, to add the possible training document images that have an oracle accuracy greater than a target accuracy threshold to the set of training document images.

In one or more embodiments, in addition to using the oracle accuracy for the purposes of determining which document images to add to the training document images, the oracle accuracy may be used to train the feature selection model. For the set of documents, have a set of extraction features. The feature selection model selection model tries to find features that are more relevant to the oracle accuracy. The feature selection model generates a correlation score for the features based on the correlation of the features to the oracle accuracy. The goal of the feature selection model is to find the subset of features that can model the extraction accuracy.

Figure 4:
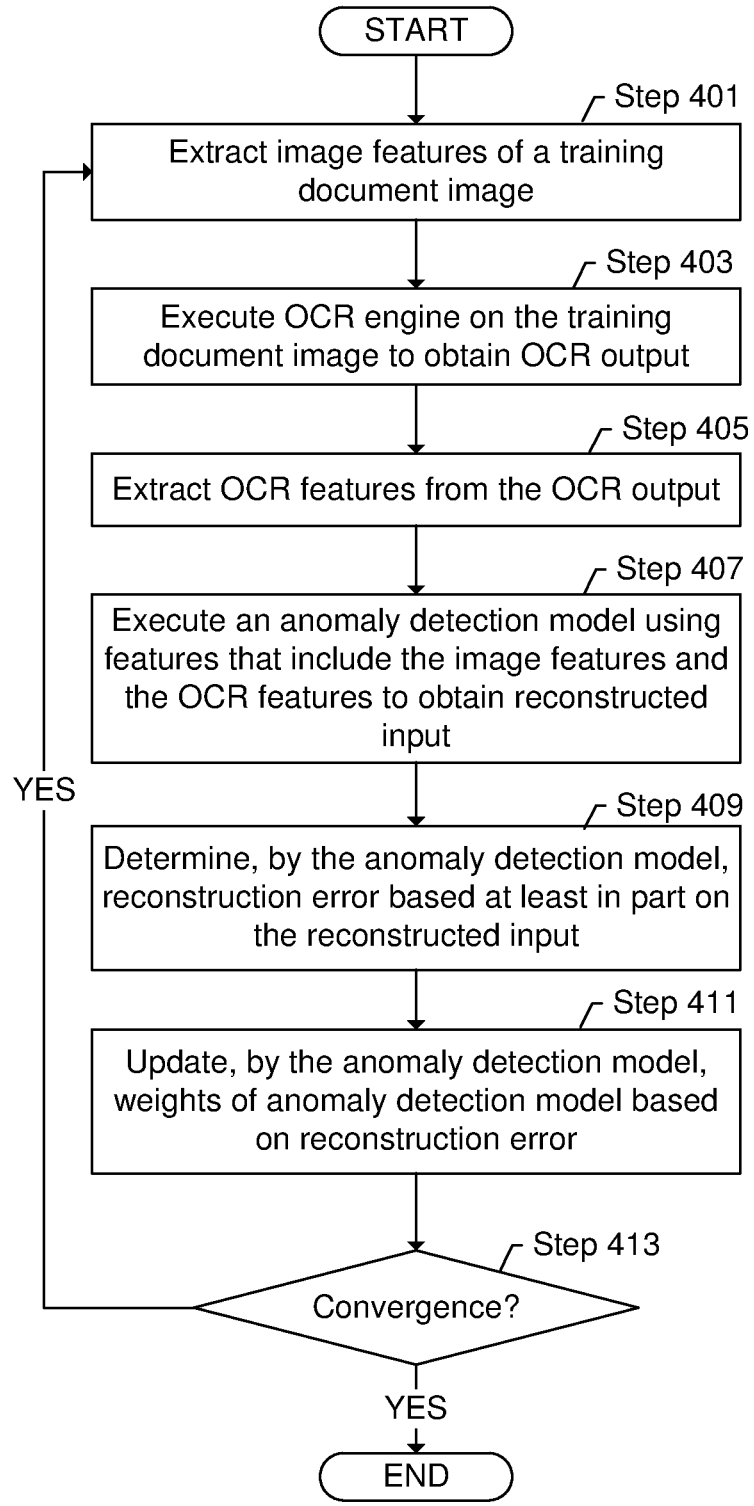
FIG. 4 shows a flowchart for training an anomaly detection model in accordance with one or more embodiments.

FIG. 4 shows a flowchart for training the anomaly detection model in accordance with one or more embodiments. The anomaly detection model perform unsupervised learning using training document images. In Step 401, image features of a training document image are extracted. The OCR engine is executed on the training document image to obtain OCR output in Step 403. Further, OCR features are extracted from the OCR output in Step 405. In Step 407, an anomaly detection model is executed using features that include, at least, the image features and the OCR features to obtain training reconstructed input (i.e., reconstructed input determined for a training document image). Other features may be included. The anomaly detection model generates the reconstruction error from the training document image in Step 409. The anomaly detection model then updates the weights in the anomaly detection model based on the reconstruction error in Step 411. For example, updating the weights may be done using an optimizing algorithm like Gradient Descent, ADAM, etc. The optimizers may be built-in methods that the user can change. In Step 413, a determination is made to check whether convergence is achieved. If convergence is not achieved, the flow may proceed to Step 401 to continue training. If convergence is achieved, the flow may end.

The anomaly detection model may start off training with a high error (random weights), regardless of the type of inputs. The goal of the training phase is to learn the weights that would minimize/optimize this error. Once the anomaly detection model is fully trained, then the anomaly detection model is deemed to have learned the best latent representation of the training data.

In the present application, in one or more embodiments, the anomaly detection model is exclusively on non-anomalous data in order to learn inherent patterns and structure of the non-anomalous data. Thus, when new document images are received, the anomalous document images may be flagged. In other words, by training on non-anomalous documents only, the anomaly detection model is somehow learning the boundaries (in the feature space) of the good documents. After training, when a document image falls within those boundaries, the document image will have a low anomaly score, because the document image is similar to the non-anomalous documents. If the document image does not have a good score, the document image will have a high anomaly score: inclusion-exclusion principle.

Corporations, schools, organizations, and other institutions often batch process hundreds or thousands of scanned images of forms having end user data to store in a database. Because of the shear volume of forms, it is impractical to have users review each scanned image and manually extract text. However, purely relying on OCR engines and extraction models may result in incorrect or incomplete data in the database. For example, some characters may be misrecognized, some characters may not be properly associated with the correct key identifier, etc. Because of the errors, the data integrity is reduced.

There are different sources of the errors. For example, an OCR engine may have text-based errors (e.g., "1" versus letter "l" versus exclamation point). As another example, the brightness of the image or lack thereof may cause errors in the resulting extraction. Further, the crowded nature of the form may cause errors. Because of the different sources of possible errors, one or more embodiments provide a framework that considers each of the different sources to determine the extraction accuracy from a document image. Thus, only a subset of the document images (i.e., those with an extraction accuracy less than the anomaly threshold) are sent for further processing while at the same time preserving the integrity of the underlying database.

Figure 5A:
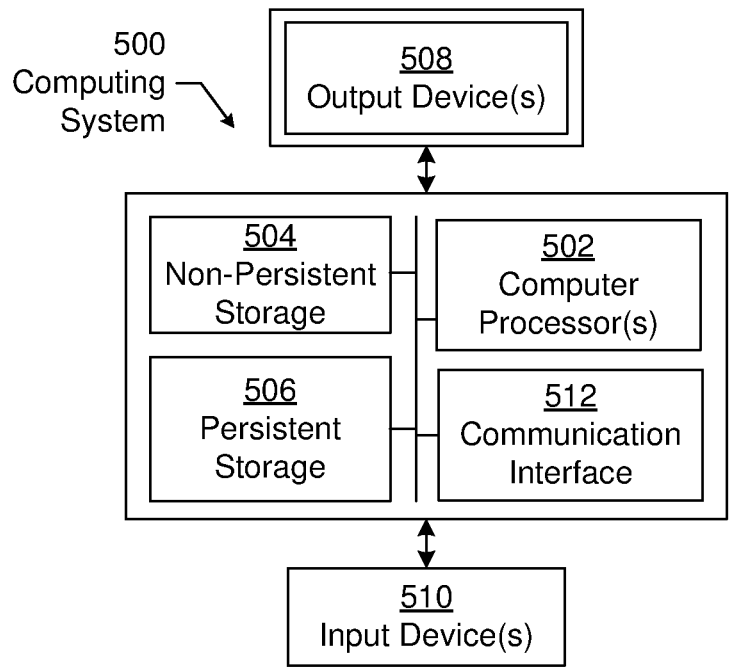
FIGS. 5A and 5B show a computing system in accordance with one or more embodiments of the invention.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
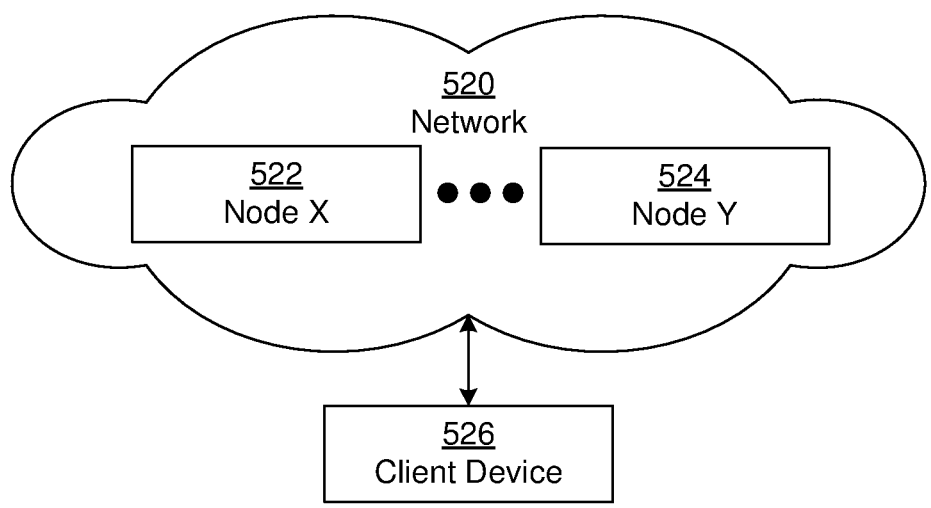

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

In the description, the term, "or", means "and" or "exclusive or". Further, unless explicitly stated, "or" in relation to a set of items means any number of items from the set including any number of each item from the set as well as any combination including combinations that include additional items not described.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
for each extraction model of a plurality of extraction models,
generating, by the extraction model, a plurality of key identifier, key value pairs for the extraction model for a possible training document image, and
comparing the plurality of key identifier, key value pairs for the extraction model with a plurality of key identifier, key value pairs in ground truth information defined for the possible training document image to obtain a combined accuracy level for the extraction model;
aggregating the combined accuracy level across the plurality of extraction models to obtain an oracle accuracy for the possible training document image;
selecting the possible training document image as a training document image when the oracle accuracy is greater than an accuracy threshold;
executing an anomaly detection model on a first plurality of features obtained for the training document image to obtain reconstructed input;
determining a reconstruction error based at least in part on the reconstructed input;
updating a plurality of weights of the anomaly detection model using the reconstruction error;
extracting a plurality of image features of a document image of a document, wherein extracting the plurality of image features comprises:
executing a convolutional neural network-based architecture on the document image to obtain an image embedding model feature, wherein the plurality of image features comprises the image embedding model feature;
executing an optical character recognition (OCR) engine on the document image to obtain OCR output;

extracting a plurality of OCR features from the OCR output;
executing, after updating the plurality of weights, the anomaly detection model using a second plurality of features comprising the plurality of OCR features and the plurality of image features to generate an anomaly score; and
presenting the anomaly score.

2. The method of claim 1, wherein the image embedding model feature is in an output of a fully connected layer of the convolutional neural network-based architecture.

3. The method of claim 1, further comprising:
calculating a plurality of general image features from a plurality of pixels of the document image,
wherein the plurality of image features comprises the plurality of general image features.

4. The method of claim 1, further comprising:
extracting a plurality of text features using the OCR output and a template of a document type corresponding to the document image,
wherein the second plurality of features further comprises the plurality of text features.

5. The method of claim 4, further comprising:
training a term frequency inverse document frequency (TF-IDF) vectorizer using the template to obtain a trained TF-IDF vectorizer; and
executing the trained TF-IDF vectorizer on the OCR output to obtain the plurality of text features.

6. The method of claim 4, wherein the plurality of text features is a vector for each unique keyword in a document corresponding to the document image with a corresponding frequency of the keyword.

7. The method of claim 1, further comprising:
selecting a subset of the second plurality of features based on a learned correlation between each of the second plurality of features and the oracle accuracy.

8. The method of claim 7, further comprising:
selecting the subset having a weight above a weight threshold.

9. The method of claim 1, further comprising:
executing a variational autoencoder (VAE) model as the anomaly detection model on a subset of the second plurality of features to obtain the reconstructed input; and
comparing the reconstructed input against the subset of the second plurality of features to obtain the anomaly score.

10. The method of claim 9, further comprising:
comparing the anomaly score against an anomaly threshold; and
flagging the document image as anomalous when the anomaly score satisfies the anomaly threshold.

11. The method of claim 1, further comprising:
performing, by the anomaly detection model, unsupervised learning using a plurality of training document images.

12. A system comprising:
a computer processor;
a plurality of extraction models, wherein each extraction model is configured to:
generate a plurality of key identifier, key value pairs for the extraction model for a possible training document image, and
compare the plurality of key identifier, key value pairs for the extraction model with a plurality of key identifier, key value pairs in ground truth information defined for the possible training document image to obtain a combined accuracy level for the extraction model;
an oracle accuracy calculator configured to aggregate the combined accuracy level across the plurality of extraction models to obtain an oracle accuracy for the possible training document image;
a feature selection model configured to:
select the possible training document image as a training document image when the oracle accuracy is greater than an accuracy threshold,
execute an anomaly detection model on a first plurality of features obtained for the training document image to obtain reconstructed input,
determine a reconstruction error based at least in part on the reconstructed input, and
update a plurality of weights of the anomaly detection model using the reconstruction error;
an image feature extractor configured to extract a plurality of image features of a document image of a document, wherein extracting the plurality of image features comprises:
executing a convolutional neural network-based architecture on the document image to obtain an image embedding model feature, wherein the plurality of image features comprises the image embedding model feature;
an OCR feature extractor configured to extract a plurality of optical character recognition engine (OCR) features from OCR output of an OCR engine; and
the anomaly detection model, executing on the computer processor, configured to generate an anomaly score using a second plurality of features comprising the plurality of OCR features and the plurality of image features after the plurality of weights are updated.

13. The system of claim 12, further comprising:
the feature selection model configured to select a subset of the second plurality of features based on relevance to determining an extraction accuracy.

14. The system of claim 12, further comprising:
a text feature extractor configured to:
extract a plurality of text features using the OCR output and a template of a document type corresponding to the document image,
wherein the second plurality of features further comprises the plurality of text features.

15. A method comprising:
for each extraction model of a plurality of extraction models,
generating, by the extraction model, a plurality of key identifier, key value pairs for the extraction model for a possible training document image, and
comparing the plurality of key identifier, key value pairs for the extraction model with a plurality of key identifier, key value pairs in ground truth information defined for the possible training document image to obtain a combined accuracy level for the extraction model;
aggregating the combined accuracy level across the plurality of extraction models to obtain an oracle accuracy for the possible training document image; and
selecting the possible training document image as a training document image when the oracle accuracy is greater than an accuracy threshold;
extracting a plurality of image features of the training document image of a training document, wherein extracting the plurality of image features comprises:

executing a convolutional neural network-based architecture on the training document image to obtain an image embedding model feature, wherein the plurality of image features comprises the image embedding model feature;

executing an optical character recognition (OCR) engine on the training document image to obtain OCR output;

extracting a plurality of OCR features from the OCR output;

executing an anomaly detection model using a plurality of features comprising the plurality of OCR features and the plurality of image features to obtain reconstructed input;

determining, by the anomaly detection model, reconstruction error, based at least in part on the reconstructed input; and updating, by the anomaly detection model, a plurality of weights of the anomaly detection model using the reconstruction error.

* * * * *